June 11, 1929.  J. STUBBERS  1,717,276
PROCESS OF MAKING TERMINAL LUGS
Filed June 15, 1927   2 Sheets-Sheet 1
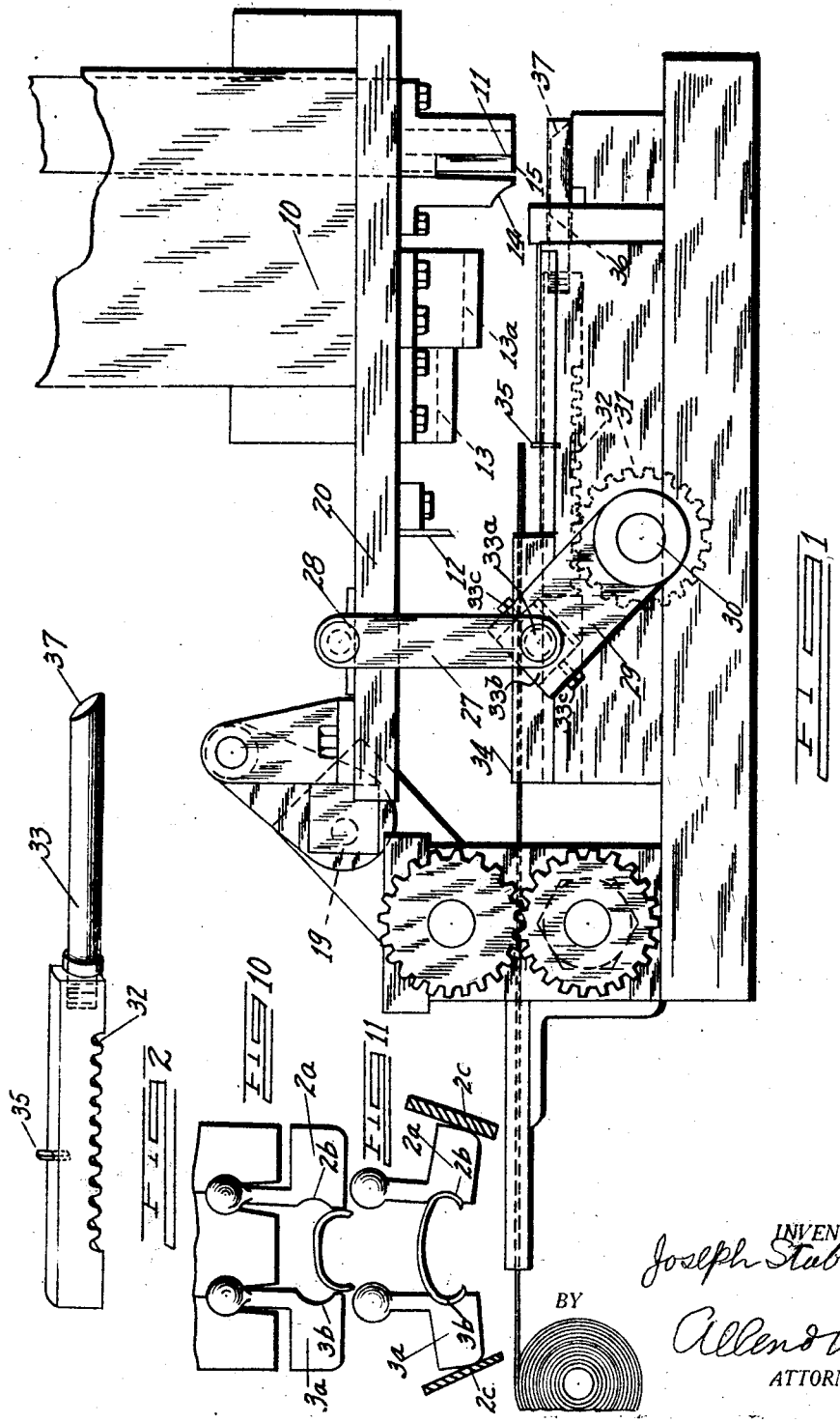

June 11, 1929.   J. STUBBERS   1,717,276
PROCESS OF MAKING TERMINAL LUGS
Filed June 15, 1927   2 Sheets-Sheet 2
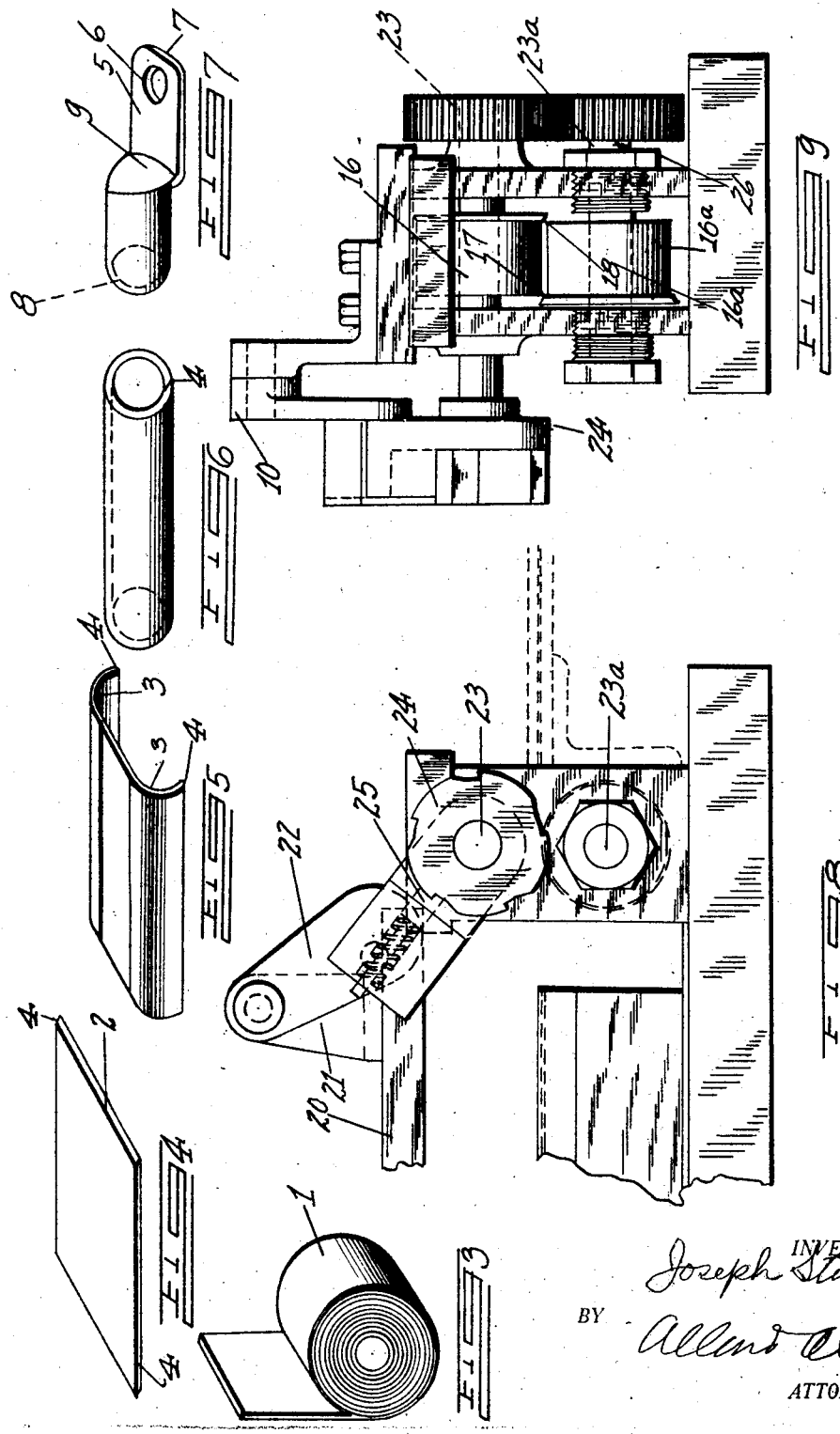
INVENTOR.
Joseph Stubbers
BY
ATTORNEY.

Patented June 11, 1929.

1,717,276

UNITED STATES PATENT OFFICE.

JOSEPH STUBBERS, OF CINCINNATI, OHIO, ASSIGNOR TO THE INCANDESCENT LIGHT & STOVE COMPANY, OF CINCINNATI, OHIO, A CORPORATION OF OHIO.

PROCESS OF MAKING TERMINAL LUGS.

Application filed June 15, 1927. Serial No. 199,024.

My invention relates to terminal lugs for electrical installations and process of making same, and particularly to a continuous process for making terminal lugs from sheet stock instead of tubular stock from which satisfactory terminals have heretofore, to the best of my knowledge and belief, been made.

It is the object of my invention to provide a new type of terminal which, in accordance with the novel steps of my process, may be made from flat sheet stock. Heretofore, to the best of my knowledge and belief, satisfactory terminals have not been made from flat stock. Further, it has been almost impossible to form a sheet into a round tube. Pressing or dieing a tube with a mandrel within it has been known for many year, but to form a flat piece into tubular shape, to insert the tube thus formed on a mandrel and to then press out the lug would have required such a number of expensive operations, that such a method would not have been practical. My new process, however, in which I form the tube about the mandrel and support the portion of the tube not to be stamped both internally and externally as a step in a continuous process, is entirely practical and economical.

Specifically, it is the object of my invention to feed and form edge portions in a continuous web of material which will overlap and form a tube of uniform thickness, and to cut the web into pieces, each one of which will be the required length. I then bend the piece into what I call a half round shape. Next I complete the bending around the mandrel until the piece is substantially round with the edges overlapping and forming a tight joint. Following this step I force the tube with a shoulder of the mandrel partially through a round die to insure a permanent joint, and a tube of uniform contour. The part which remains in the die is thus securely held on the inside and outside so that when the metal of the tube not held in the die is drawn out, the spring in the metal is overcome, and the overlapping edges of the tube are supported so that there will be no tendency for the overlap joint to spring open. During this step the piece is carried on a mandrel having a sloping outer end. I next press the offset neck and flat attaching plate while the tubular end is supported internally on the mandrel. The neck is thus pulled and stretched uniformly. I can make a lug in which the end edges are straight, and the neck portion can be bent at a much more abrupt angle which allows great economy in solder. As I use flat stock, economy in the cost of making terminals is experienced, and as I form the tube about the mandrel and feed the sheets onto the mandrel from the end opposite that which supports the tube during forming and pressing, I am able to carry out a completely continuous process, as I force the completed lug off the mandrel with the next succeeding tube.

The above and other objects which will be noted during the course of the ensuing disclosure I accomplish by that certain combination of parts and sequence of operations of which I have shown a preferred modification.

Referring to the drawings:—

Figure 1 is a side elevation of a portion of a punch press which I find preferable to use for carrying out my new process resulting in the new terminal lug.

Figure 2 is a perspective view of the movable mandrel which I find it advantageous to employ.

Figure 3 is a perspective view of a rolled web of flat sheet stock.

Figure 4 is a perspective view of one piece of stock cut off for making a terminal lug.

Figure 5 is a perspective view of the piece shown in Figure 4 after being bent into partially round shape.

Figure 6 is a perspective view of the tube before the pressing and neck forming operation.

Figure 7 is a perspective view of a finished terminal lug showing the formed offset neck.

Figure 8 is a side elevation showing the ratchet drive for the web feeding device.

Figure 9 is an end elevation showing the edge beveling and feeding rollers.

Figure 10 is a diagrammatic end elevation showing the die for forming the first bending operation on the flat piece.

Figure 11 shows the same parts as are indicated in Figure 3 at a later step in the bending operation, Referring first to Figures 3 to 7, I have shown a roll 1 of flat sheet copper stock. The web or strip of sheet metal is usually first cut into suitable length pieces 2. Each of the pieces 2 is first bent partially round as indicated at 3. In Figures 10 and 11 I have shown a preferred type of die for performing the initial bending operation. The die which is composed of complementary pieces 2$^a$ and 3$^a$ first bends down the edges of the flat piece. Then the bent pieces slip in between the contoured portions 2$^b$ and 3$^b$ and the outer edges of the dies engage slanting plates 2$^c$ which cause the tubes to have the side edges bent in still further, as shown in Figure 11. In the preferred form of piece, the edges of the pieces are beveled or grooved as indicated at 4, so that when the piece is formed into a tube, the overlapping edges will form a sealed joint in which the walls of the tube are of uniform thickness. The half bent piece such as is shown in Figure 5 is then formed on the mandrel over which the piece is disposed into a tube which does not have any open seam line due to the overlapping edges 4.

The final operation or sequence of operations shapes the terminal lug into the shape indicated in Figure 7. The terminal has a stamped flat attaching plate portion 5 through which ordinarily a hole such as is indicated at 6 is punched. The end of the plate 5 may either be cut off flat, or may be cut rounded as indicated at 7. The terminal is to be used for cable or wire attachment, and consequently it has a tubular recessed portion 8 from which a neck 9 is formed which extends to the attaching plate 5.

By my novel process of forming the neck while the tube is internally supported on the mandrel, and externally supported in the round die, a very abrupt bend and short neck can be made. A cross section of the neck made in my new type of terminal shows the metal to be equally stretched throughout the extent of the neck. The abrupt bend in the neck portion is quite economical in that it saves materially in the metal required and in the solder which is required to retain the cable or wire within the recessed portion. Then there being a closed seam in the tubular cable receiving end, no solder can escape along the seam.

Referring next to the mechanism which I have illustrated with which the terminals may be made, in Figure 1 I have shown the plunger 10 of a double acting press. The press mechanism is not illustrated as it forms no part of my invention. Within the plunger there is a punch die 11 which, when the head has been lowered to the lowest extent of the stamping and forming operation, moves down further in order to punch out the hole in the terminal. The arm 11 extending from the press head is shown as carrying the cutting die 12, the half round bending die 13, the round bending die 13$^a$, the forming die 14 and the stamping die 15. The head is also shown as connected with the roll feeding and web grooving mechanism, and with the mechanism for actuating the reciprocating mandrel.

The feeding mechanism for the web or sheets of metal is composed of a pair of rollers 16, 16$^a$, which preferably have beveled flanged edges 17, 18 one of which grooves the left upper side edge of the piece, and the other which grooves the right lower side edge of the piece, so as to form portions which will overlap without increasing the thickness of the tubular walls. The rollers may feed the web by peripheral contact or by the engagement of the flanged edges 17 and 18 of the rollers. While it is preferable to carry out the edge grooving, the particular type of edge beveling is not essential in combination with the other steps of the process.

The mechanism for turning the rollers with an intermittent advancing movement is preferably accomplished by a ratchet drive such as is indicated at 19. The punch platen has an extension 20 carrying a boss 21, in which a crank arm 22 is pivotally mounted. The rollers 16, 16$^a$, are mounted on shafts 23, 23$^a$ respectively. The shaft 23 has a ratchet toothed wheel 24 which is engaged by a spring tensioned pawl 25 on the upward stroke of the punch platen. The timing of the mechanism for advancing the work is such that the work is advanced during the upward stroke of the plunger, so that the work will be in position for cutting, shaping, forming and stamping with the downward movement of the platen. The lower feed roller is also preferably adjustably mounted on the shaft 23$^a$ on which it may be set in position for strips of different width by adjustment of the lock nut 26.

The extended arm 20 from the head carries a crank 27 pivoted in a boss 28. The crank is pivotally connected with another crank 29 which is mounted on a shaft 30. The shaft 30 is journaled in the bed of the press and carries a toothed gear 31 which engages a rack 32. The rack 32 is formed or attached to the lower side of the mandrel 33. In Figure 2 I have shown the mandrel and rack detached from the mechanism. The movement of the mandrel is a straight reciprocating stroke the timing of which, and the length of which may be varied by adjustment of the pivotal connection 33$^a$ between the cranks 27 and 29. I may, for example, mount the pivotal connection 33$^a$ in a block 33$^b$ which is retained in guides in the crank 29 as with studs 33$^c$.

The continuous strip of metal is fed on the up stroke of the press through the roller. At the same time it may be beveled by the roller. It is fed along the table bed 34, and the first operation is usually the cutting of the strip into pieces of suitable length for the terminal, by engagement with the cut off shear 12. The cut off and initial bending may be carried out in one stage of operation, however, but I find it preferable in order to provide a terminal with straight end edges, that the cutting be done prior to the initial bending. A lug 35 on the mandrel provides a means for picking up the piece and carrying it forward to the right as shown in Figure 1 to a position on the mandrel where it is engaged by the die 13, by which it is bent into the shape shown in Figure 5. The partially bent piece is then moved further to the right as shown in Figure 1, where it is engaged by the die 13ª which presses the bent side portions around the mandrel with edges overlapping or interlocking and forms the piece into the tubular structure as shown in Figure 6. The next advancing movement of the mandrel carries the tubular piece through the round restricting aperture 36 so that the front portion may be stamped while the rear portion is supported internally by the mandrel and externally by the restricting aperture 36. This insures a uniform joint of the preformed edges of the tube, and makes it perfectly round. The portion which is to remain round remains in the aperture 36, and the other end which is to be flattened, projects through the die. As has been noted, the stamping of the projecting end piece breaks down the spring of the metal at the joint. Then the mandrel recedes to the left as indicated in Figure 1, and the slanting face 37 of the mandrel is under the forming die 14 at the time of engagement to support the tube internally. During the engagement by the die 14, the slanting face of the mandrel is directly beneath the die 14.

The stamping of the terminal is accomplished by engagement of the die 15, and as has been referred to earlier in the application, as I prefer to use a double acting press, the last step of the stamping operation is the punching out of the hole 6 by the punch die 11.

The terminal is now completed, and no further stamping operations need be carried out unless the end edge of the attaching plate is to be cut off either straight or round. Such a step may be carried out by a die carried by the plunger 10 in what is thought to be an obvious manner which is not claimed as a part of my invention, it being usual to carry out such an operation on terminals made from tubular instead of flat stock.

The sequence of operations is as follows:—
The press is started and the end of metal is placed between the rolls and at every up stroke of the press the proper length of metal for one lug will be fed through the rolls. The edges will also be beveled at the edges. When the strip reaches the shearing die it is cut off on the down stroke, and on the up stroke it is carried to die 13. On the next up stroke of the press another blank is pushed under die 13, and the partly formed blank is pushed by this blank under die 13ª. When the third blank is cut, the first blank will be formed over the mandrel, and on the up stroke, will be forced into the restricting hole and the part which is to be flattened extended therethrough, and on the downward stroke the first blank will be stamped, hole punched and trimmed. On the up stroke the supported end of the lug will be carried completely through the restricted hole but it will remain on the tip of the mandrel. On the next downward stroke of the press when the mandrel is drawn back the lug will be discharged when it comes in contact with the next succeeding tube which protrudes partly through the restricted die. Thereafter a complete lug is made by every stroke of the press.

Having thus described my invention what I claim as new and desire to secure by Letters Patent is:—

1. A process of making a stamping, which consists in bending a flat metal piece into round tubular shape on an internal support, forcing the tube partially through a restricting aperture on said internal support, and forming an offset neck therein by applying external pressure to an unsupported end portion of the tube prior to the delivery thereof from said restricting aperture.

2. A process of making a metal stamping, which consists in bending a flat metal piece into tubular shape on an internal support, moving the tube thus formed on said internal support, and forming an offset neck therein by applying external pressure to the tube at an end portion thereof which protrudes beyond the end of said internal support.

3. A process of making an integral terminal lug, which consists in bending a flat metal piece with shaped edges adapted to overlap into a tubular structure on an internal support, forming an offset neck therein by applying external pressure to an end portion of the tube during an interval when said end is not supported, but while the end opposite that to be pressed is still supported both internally and externally.

4. A process of making an integral terminal lug, which consists in forming edges on a flat metallic piece, bending the flat piece into a tubular shape with the edges overlapping to form a tube of uniform thickness, supporting the tube internally, and forming an offset neck therein by applying external pressure to a portion of the tube to form it against the end of the internal support.

5. A process of making a terminal lug, which consists in forming beveled edges on a flat metal plate, bending the plate into tubular shape with the beveled edges overlapping, pressing the tube through an aperture of restricting size so as to shape the tube, and forming an offset neck in the tube by applying external pressure thereto.

6. A process of making a terminal lug, which consists in preforming edges on a flat plate, so that they will overlap and form a tube of uniform thickness, bending the plate into tubular shape while supporting the tube internally, and pressing it on said internal support through a restrictive aperture, and forming an offset neck therein by applying external pressure to a portion of the tube extending beyond the internal support.

7. A process of forming a tubular terminal lug, which consists in forming the side edges of a flat metal plate, bending the plate into tubular shape on an internal support, and pressing the tube through a restricting aperture to form a sealed closure of the preformed edges.

8. A continuous process for forming tubular terminal lugs one after another, which consists in forming the edges of a flat metal plate, feeding the plate onto an internal support, bending the plate into tubular shape about said support, and pressing the tube through a restricting aperture to form a side closure of the grooved edges, and applying external pressure to an extended end of the piece prior to its discharge through the restricting aperture.

9. Those steps in the process of forming terminal lugs, which consists as one step in bending a flat metal piece into tubular shape on an internal support, and as another step in applying external pressure to an end portion of said tubular piece, and as a third step in moving the externally pressed lug with the next successive lug during its movement into position to be externally pressed.

10. That step in the process of forming terminal lugs, which consists in feeding a flat web along a bed, and diminishing the thickness of the edges thereof, cutting off sections of the web, bending the side edges of the section into partially round shape, continuing the bending with the piece internally supported until a tubular structure is formed, and carrying the tubular piece on said internal support to a position in which external pressure may be applied to an end thereof extending beyond said internal support.

11. A process of forming a terminal lug, which consists in diminishing the thickness of edges of a flat piece, bending the flat piece into tubular shape on an internal support and forcing the tube on said internal support through a forming aperture prior to forming an offset neck therein.

12. A process of forming a terminal lug, which consists in forming a tube on a mandrel, moving the formed tube on the mandrel into such position that an end thereof may be stamped, and externally supporting an end of the tube not to be stamped during the stamping operation.

13. A process of forming a terminal lug from flat stock, which consists in forming a flat piece into cylindrical shape about a mandrel, moving the formed piece on the mandrel so that an end thereof projects beyond the end of the mandrel, and stamping the projecting end while externally supporting the non-projecting portion of the piece.

14. A process of forming a terminal lug from flat stock, which consists in forming a flat piece about a mandrel so that edges of the piece overlap, and then moving the piece so that an end thereof projects beyond the end of the mandrel, externally supporting a non-projecting portion of the piece, and stamping a slanting neck on the piece while the end projects beyond the external support by pressure of the neck against the end of the mandrel.

15. A process of making terminal lugs, which consists in forming a tube from a flat piece about an internal support, moving the formed piece into position to be stamped, and externally supporting unstamped portions of the tube during the stamping operation.

16. A process for making terminal lugs which consists in successively pressing cylindrical blanks through a restricting orifice and while retaining one end of each blank within the orifice, pressing down the metal of the other end against the end of a mandrel which internally supports said blank, to form an offset neck in the lug.

17. A process for making terminal lugs which consists in successively pressing cylindrical blanks through a restricting orifice and while retaining one end of each blank within the orifice, pressing down the metal of the other end against the end of a receding mandrel which internally supports said blank, to form an offset neck in the lug.

JOSEPH STUBBERS.